(12) United States Patent
Seok et al.

(10) Patent No.: US 10,080,140 B2
(45) Date of Patent: Sep. 18, 2018

(54) METHOD AND APPARATUS FOR TRANSMITTING DATA IN WLAN SYSTEM

(75) Inventors: Yong Ho Seok, Anyang-si (KR); Bong Hoe Kim, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 13/499,473

(22) PCT Filed: Oct. 1, 2010

(86) PCT No.: PCT/KR2010/006719
§ 371 (c)(1),
(2), (4) Date: May 17, 2012

(87) PCT Pub. No.: WO2011/040789
PCT Pub. Date: Apr. 7, 2011

(65) Prior Publication Data
US 2012/0224570 A1    Sep. 6, 2012

Related U.S. Application Data

(60) Provisional application No. 61/247,575, filed on Oct. 1, 2009, provisional application No. 61/257,025, filed
(Continued)

(30) Foreign Application Priority Data

Apr. 30, 2010 (KR) ........................ 10-2010-0040591

(51) Int. Cl.
*H04L 27/26* (2006.01)
*H04W 16/14* (2009.01)
(Continued)

(52) U.S. Cl.
CPC ........... *H04W 16/14* (2013.01); *H04L 5/0023* (2013.01); *H04L 5/0048* (2013.01); *H04L 27/2613* (2013.01); *H04W 84/12* (2013.01)

(58) Field of Classification Search
CPC ....................................................... H04L 27/18
(Continued)

(56) References Cited

U.S. PATENT DOCUMENTS

2006/0291373 A1* 12/2006 Nakao ........................... 370/208
2007/0291753 A1    12/2007 Romano
(Continued)

FOREIGN PATENT DOCUMENTS

KR    10-2008-0020472 A    3/2008
KR    10-2009-0024623 A    3/2009

OTHER PUBLICATIONS

Tu et al. Cyclic Shift for More Than 4 Antennas in Non-VHT Portion. Doc. IEEE 802.11-10/0916r0. Jul. 15, 2010.*
(Continued)

*Primary Examiner* — Brian D Nguyen
(74) *Attorney, Agent, or Firm* — Birch, Stewart, Kolasch & Birch, LLP

(57) ABSTRACT

A method of transmitting data in a WLAN system using a transmission frequency band including a plurality of frequency blocks includes generating a transmission information field, including at least one of information for timing acquisition of a frame, channel estimation information, and information for demodulation and decoding of the data, generating a plurality of transformed transmission information fields by multiplying the transmission information field by a transform sequence, and transmitting the plurality of transformed transmission information fields through the plurality of respective frequency blocks. The transform sequence comprises a plurality of transform values, and the
(Continued)

plurality of transformed transmission information fields is generated by multiplying transmission information field by each of a plurality of transform values.

3 Claims, 13 Drawing Sheets

Related U.S. Application Data on Nov. 1, 2009, provisional application No. 61/350,906, filed on Jun. 2, 2010.

(51) Int. Cl.
  *H04L 5/00* (2006.01)
  *H04W 84/12* (2009.01)
(58) Field of Classification Search
  USPC .................................................. 370/480
  See application file for complete search history.

(56) References Cited

U.S. PATENT DOCUMENTS

| | | |
|---|---|---|
| 2008/0002780 A1 | 1/2008 | Yu et al. |
| 2008/0165969 A1 | 7/2008 | Khandekar et al. |
| 2010/0208832 A1 | 8/2010 | Lee et al. |
| 2011/0013575 A1* | 1/2011 | Liao et al. .................. 370/329 |
| 2011/0053582 A1* | 3/2011 | Mueck ............... H04W 52/283 |
| | | 455/419 |

OTHER PUBLICATIONS

Stacey et al. Specification Framework for TGac, IEEE 802.11-09/0992r11, May 18, 2010.*

IEEE Part11, Amendment 5. IEEE Std 802.11n-2009. IEEE Computer Society. Approved Sep. 11, 2009.*

Stacey et al. Proposed Specification Framework for TGac. IEEE P802.11 Wireless LANs. Sep. 24, 2009.*

Stacey et al. Specification Framework for TGac. IEEE P802.11 Wireless LANs. May 18, 2010.*

Lanante et al., "IEEE802.11ac Preamble with Legacy 802.11a/n Backward Compatibility," doc: IEEE 802.11-yy/0847r0, Jul. 14, 2009, Slides 1-18.

* cited by examiner

[Fig. 1]
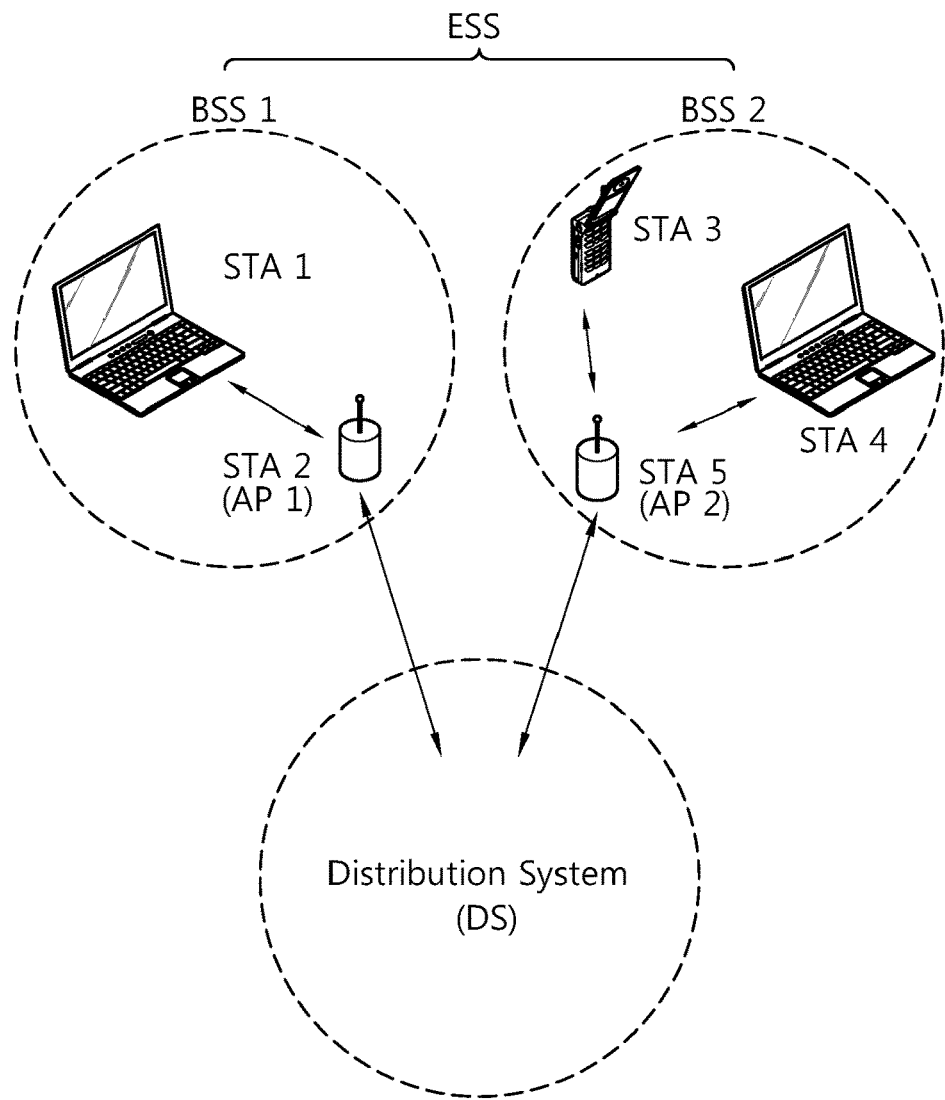

[Fig. 2]
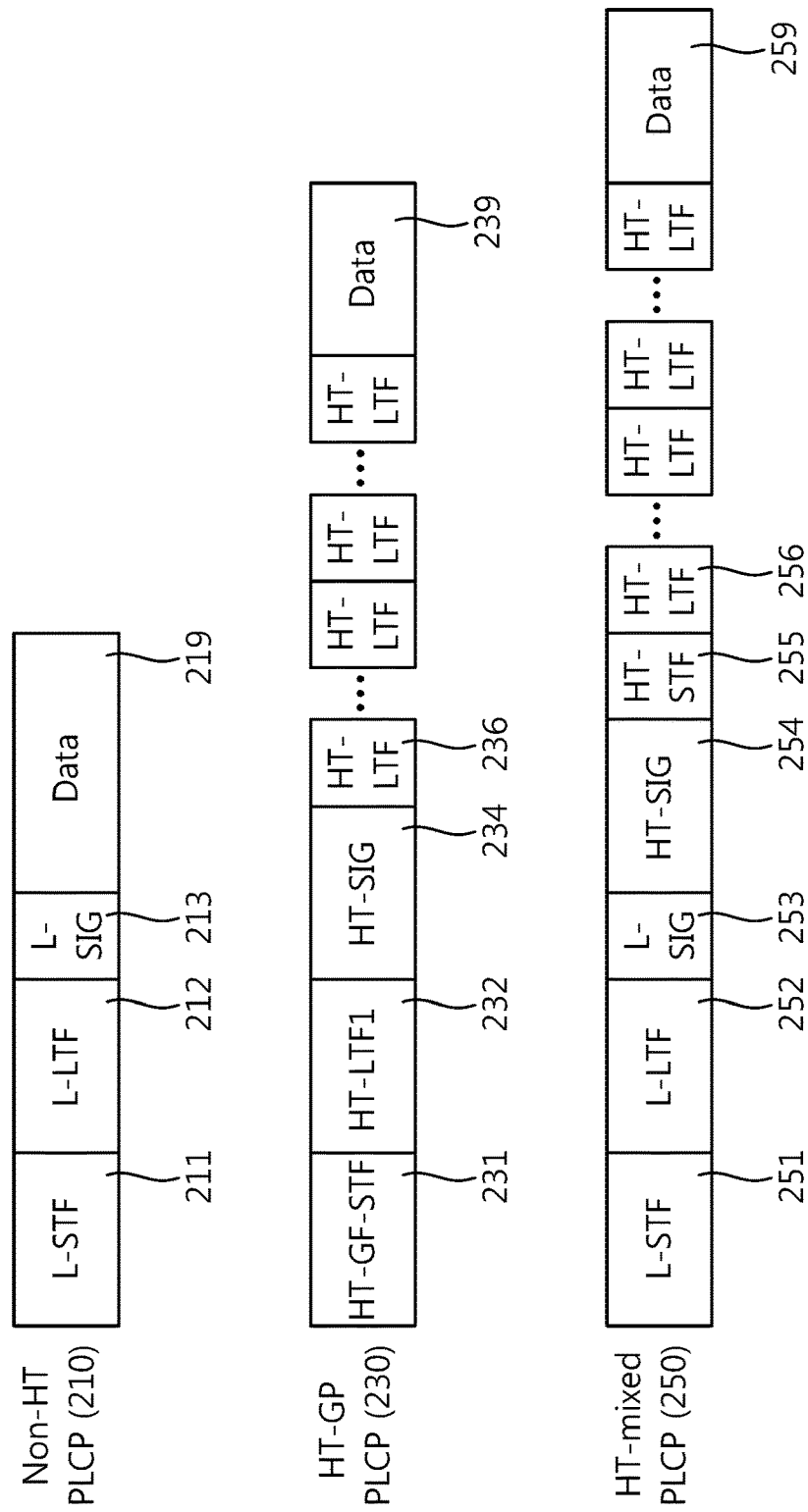

[Fig. 3]
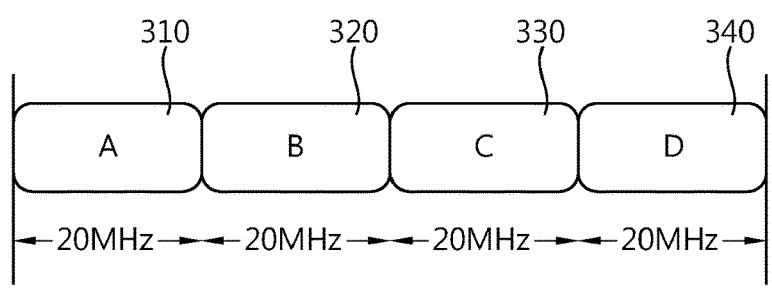
[Fig. 4]
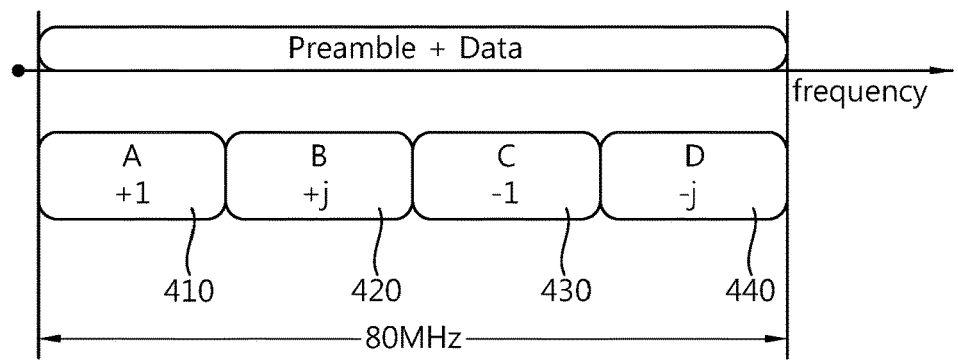

[Fig. 5]
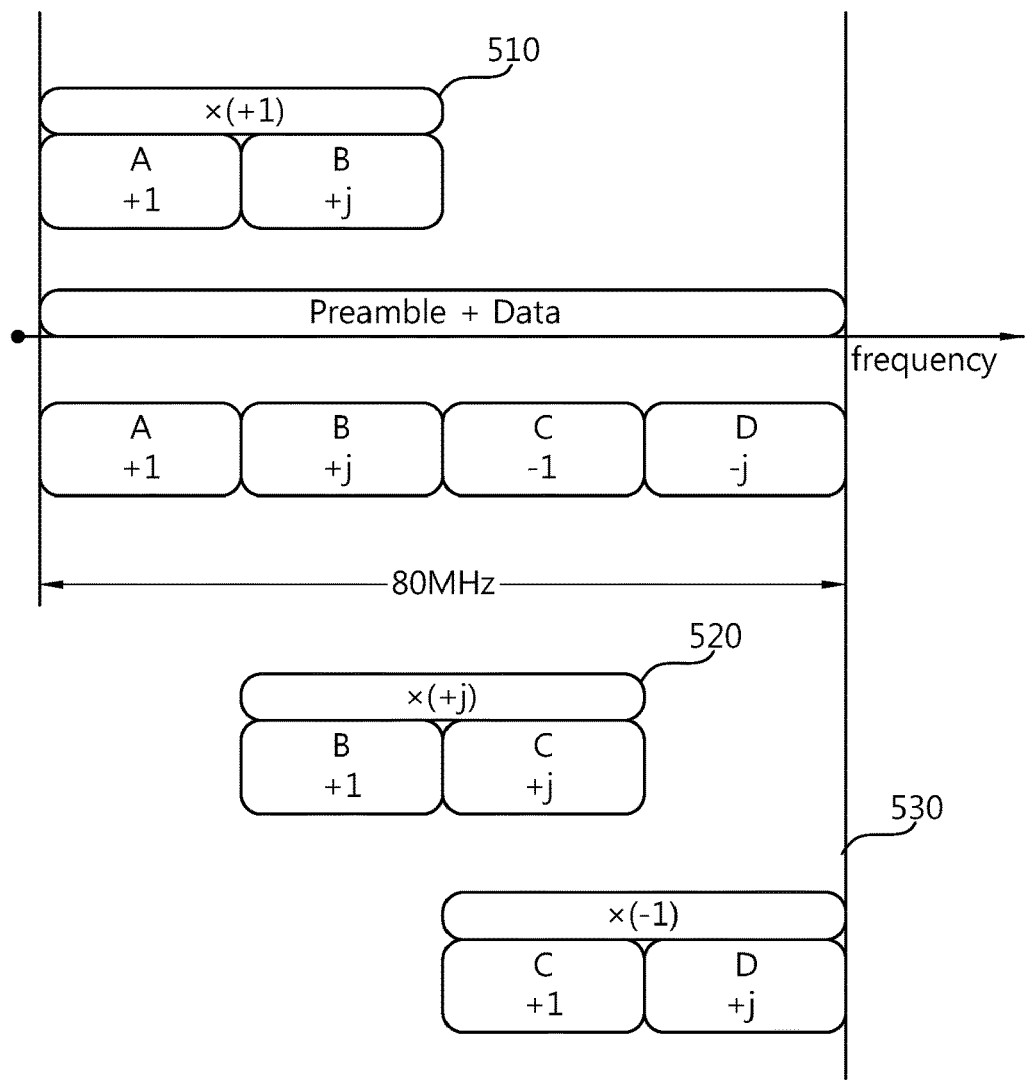

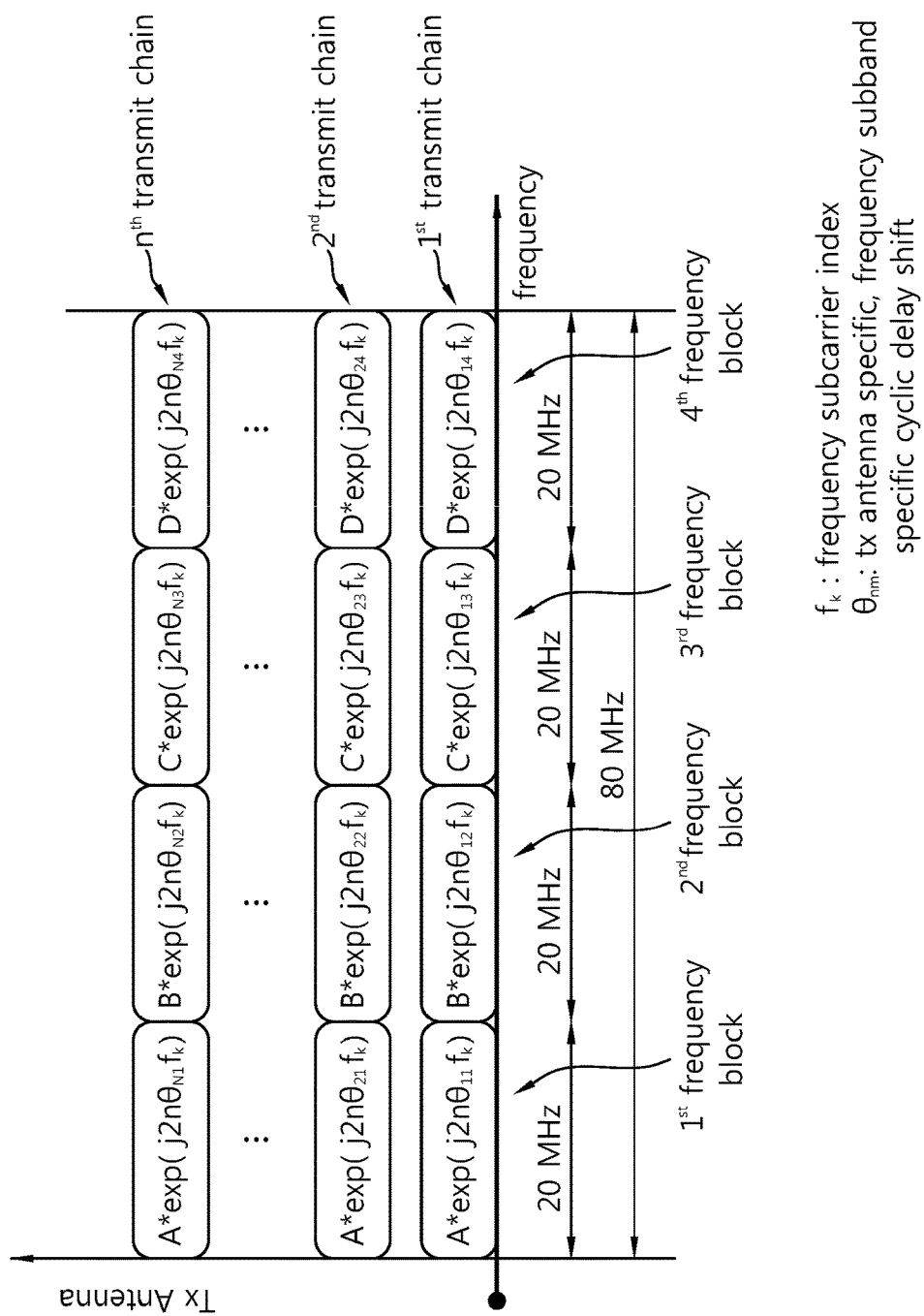
[Fig. 6]

[Fig. 7]
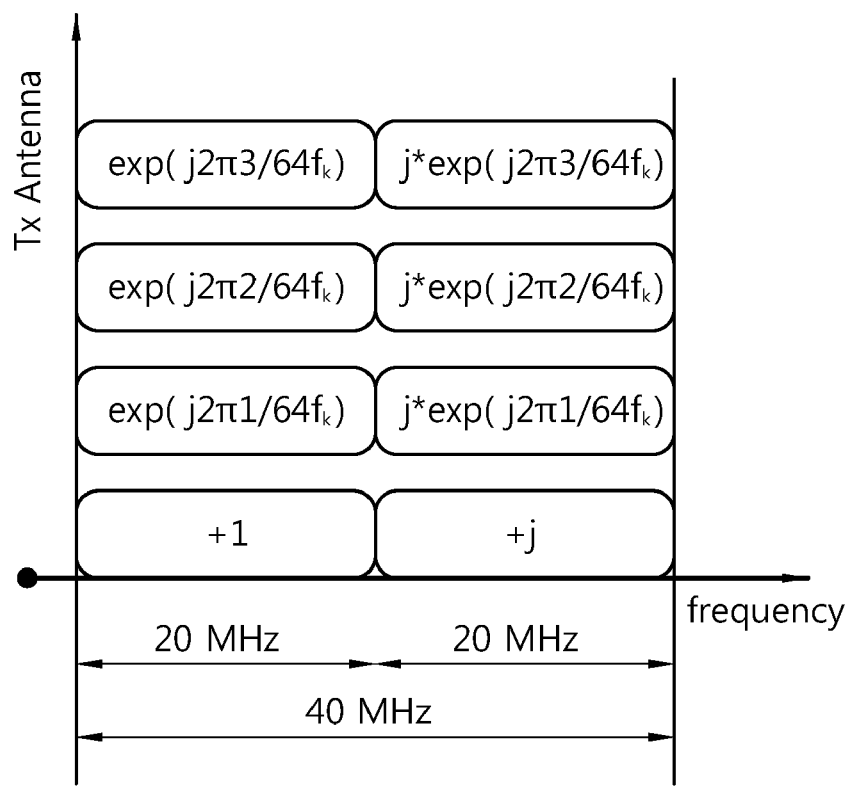
$f_k$ : frequency subcarrier index

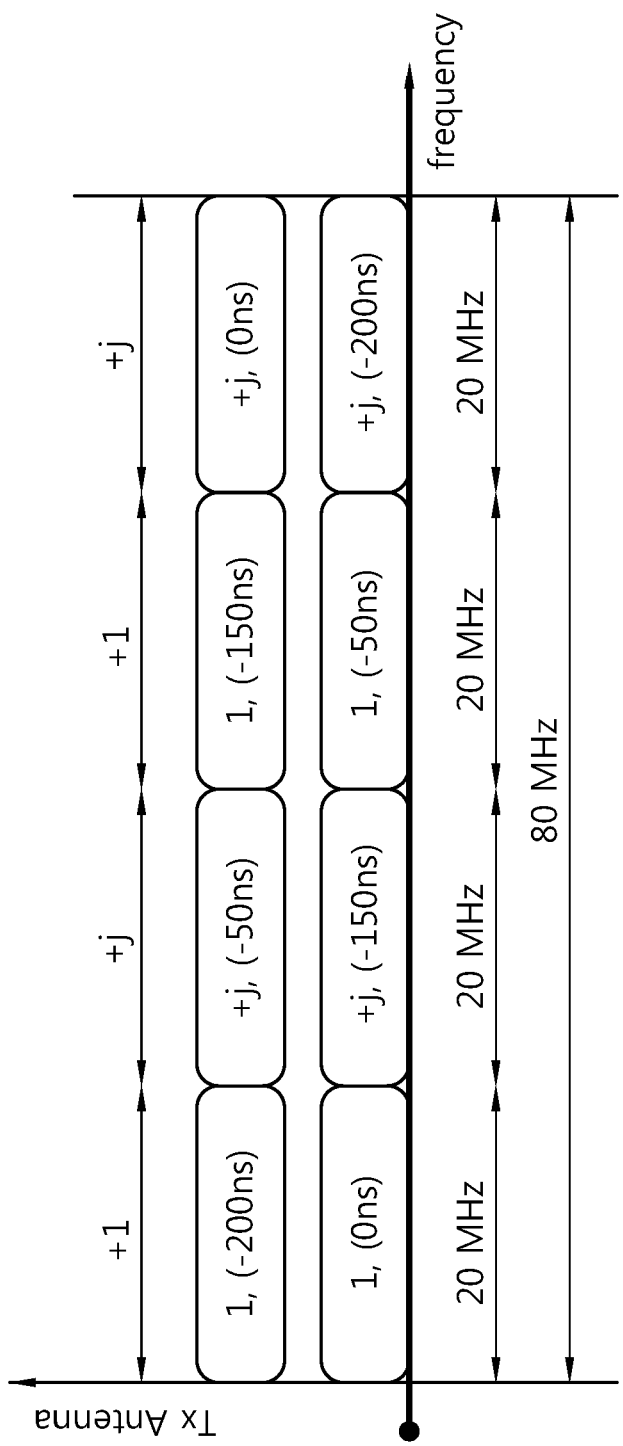
[Fig. 8]

[Fig. 9]
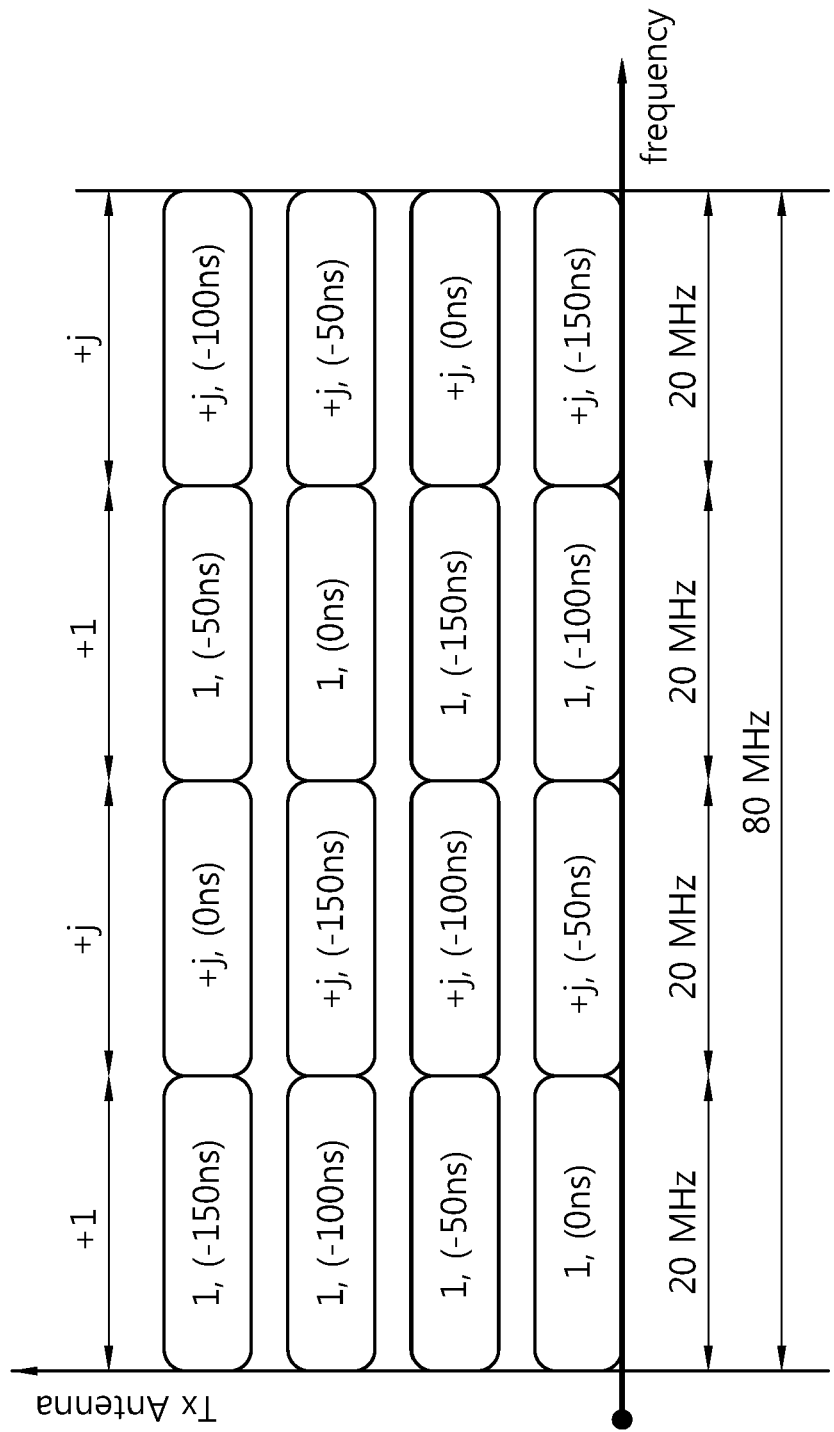

[Fig. 10]
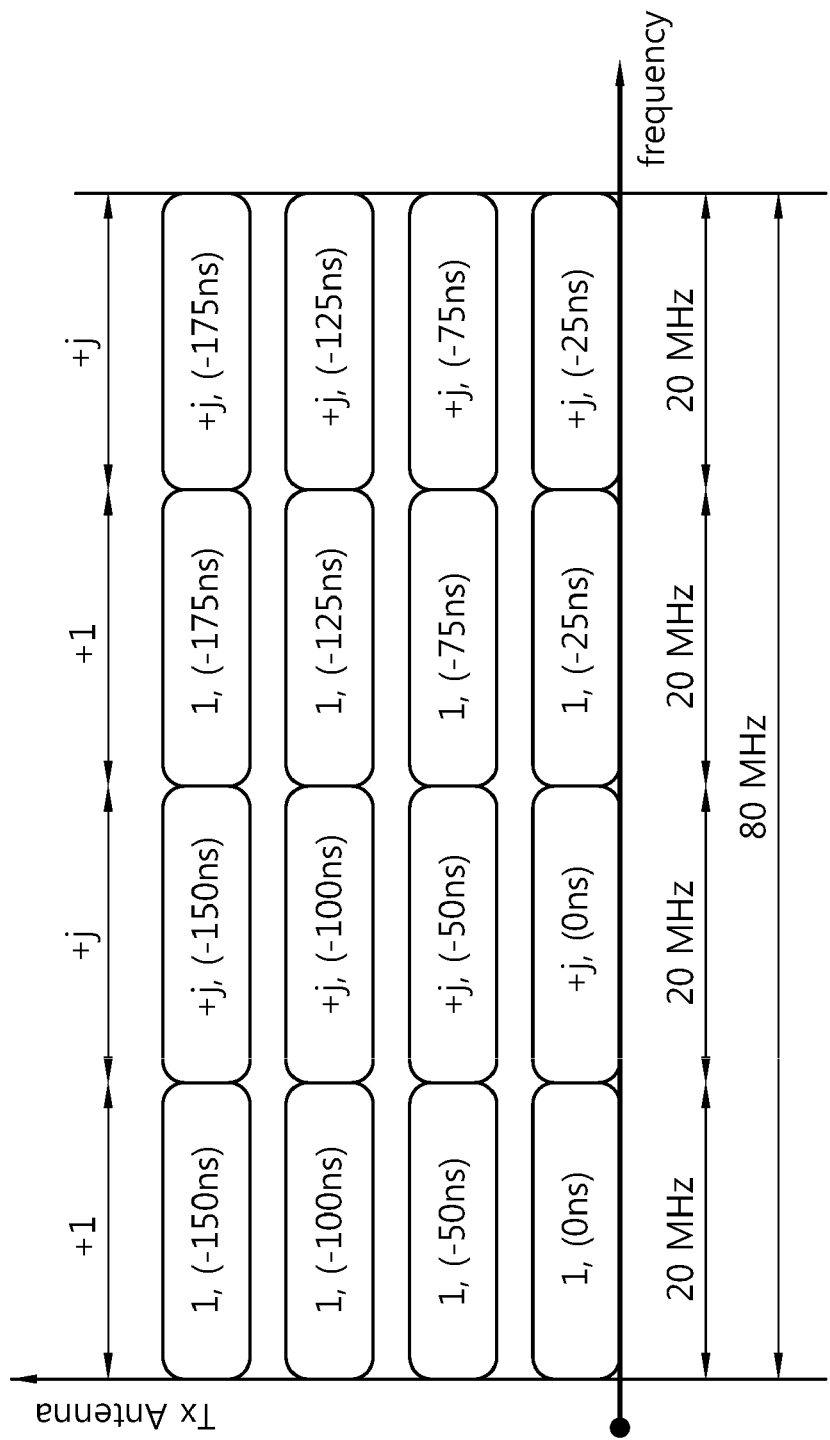

[Fig. 11]
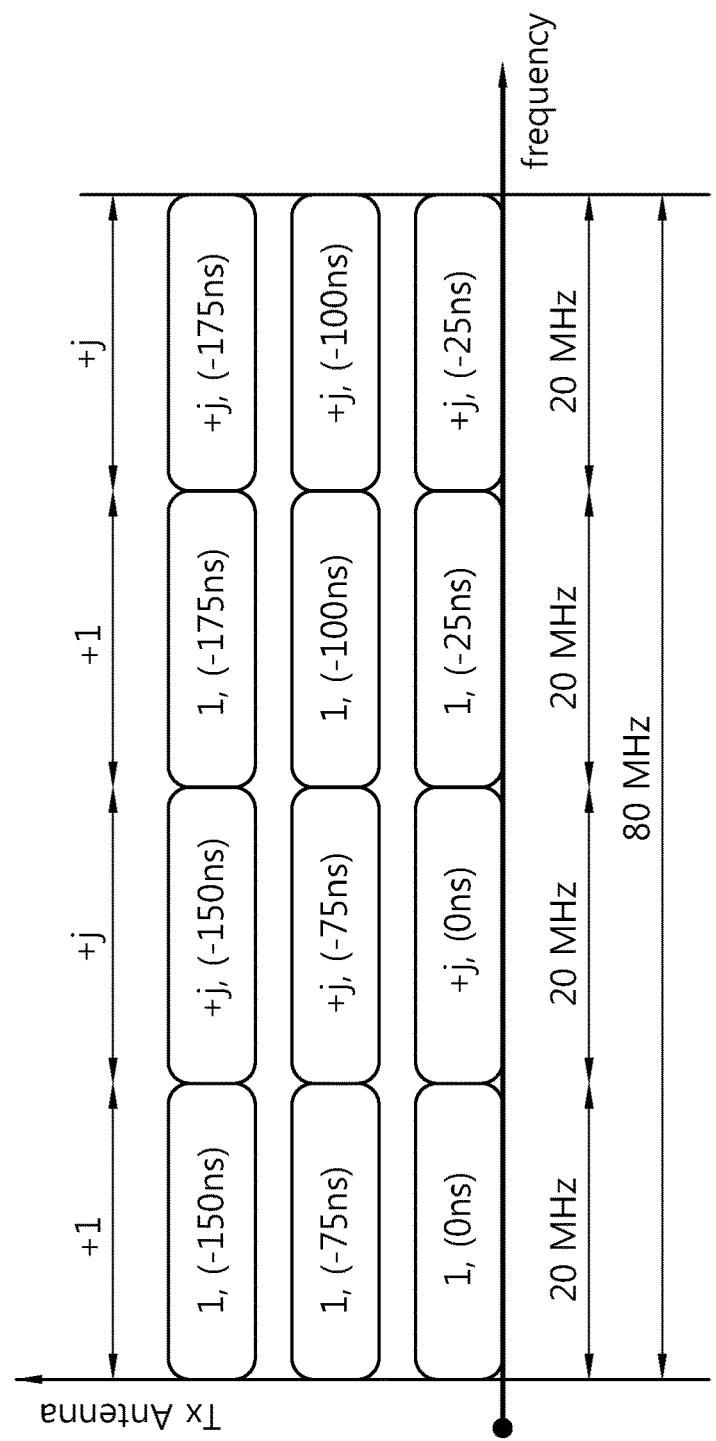

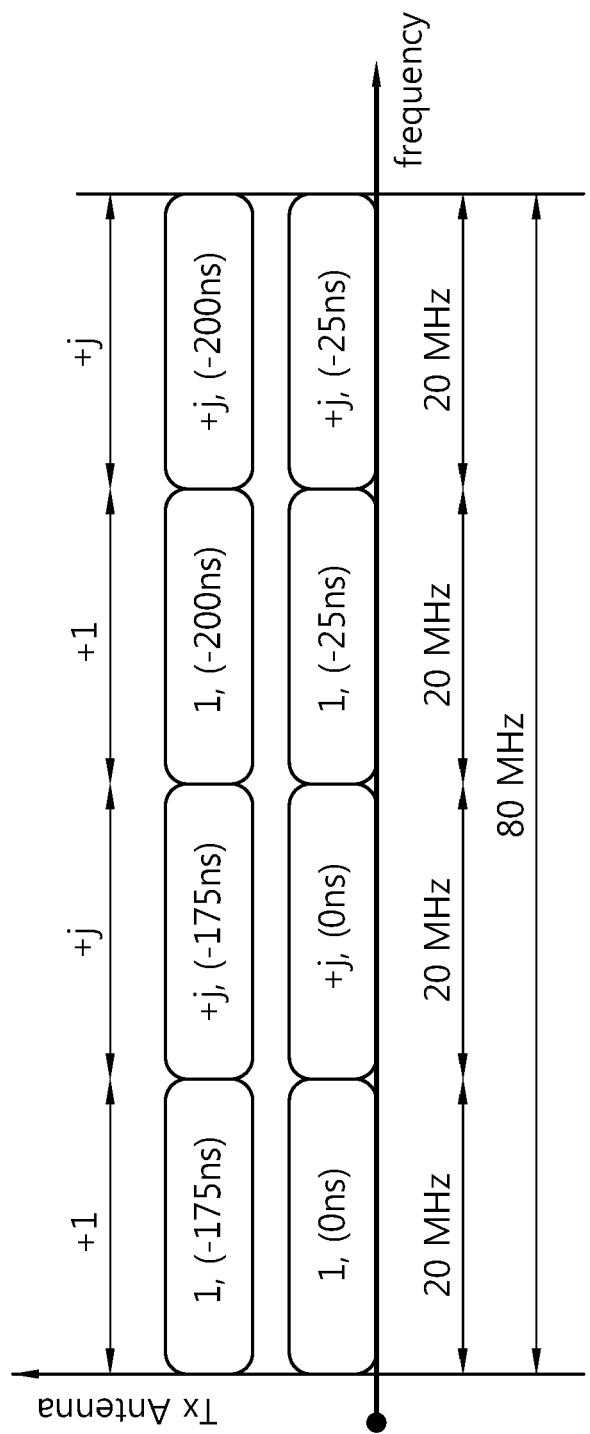
[Fig. 12]

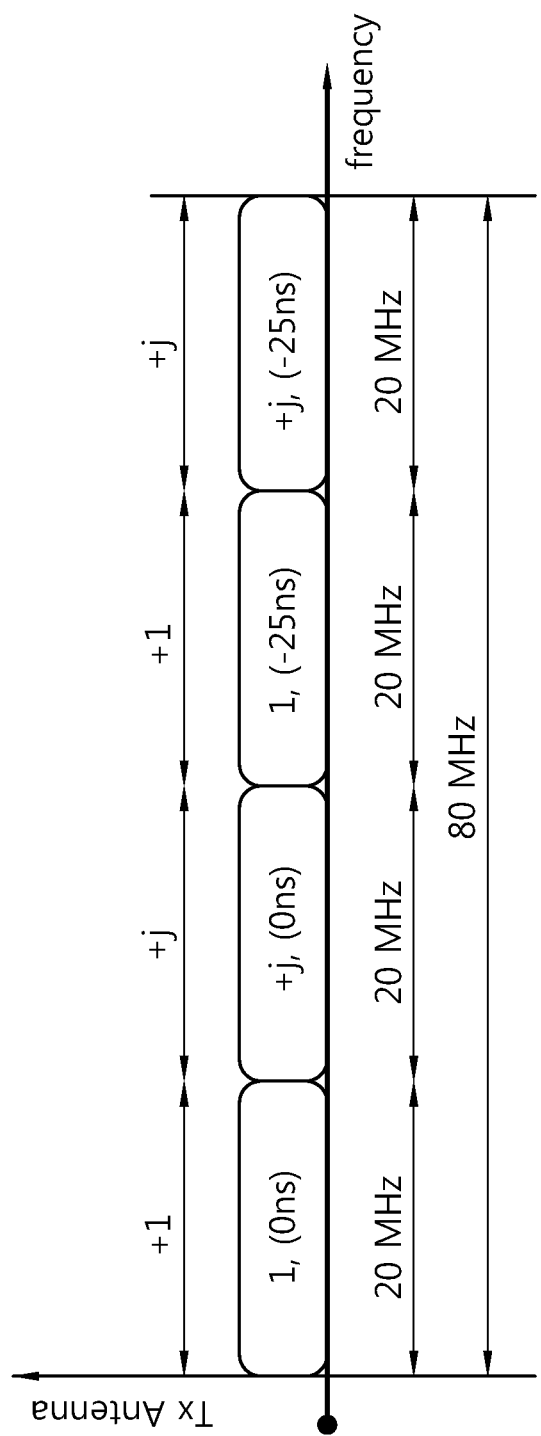
[Fig. 13]

[Fig. 14]
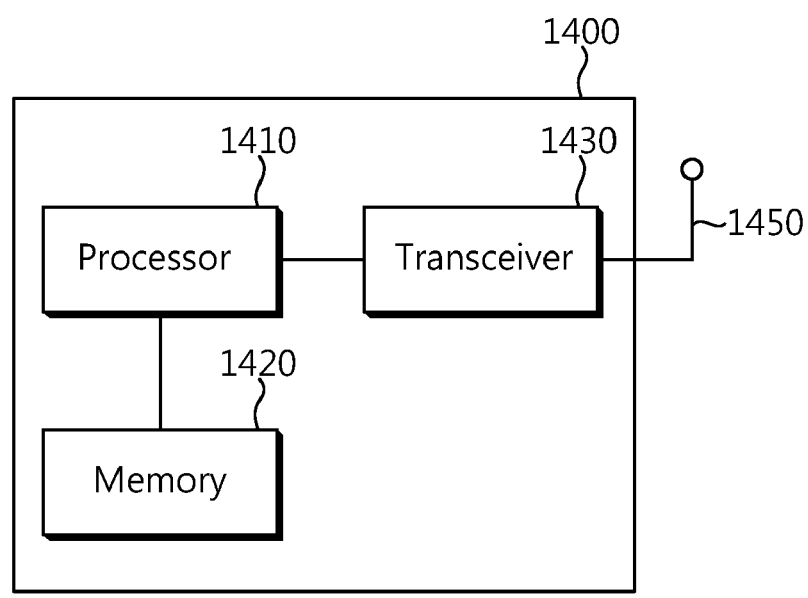

METHOD AND APPARATUS FOR TRANSMITTING DATA IN WLAN SYSTEM

CROSS REFERENCE TO RELATED APPLICATIONS

This application is the National Phase of PCT/KR2010/006719 filed on Oct. 1, 2010, which claims priority under 35 U.S.C. 119(e) to U.S. Provisional Application Nos. 61/247,575 filed on Oct. 1, 2009, 61/257,025 filed on Nov. 1, 2009, 61/350,906 filed on Jun. 2, 2010 and under 35 U.S.C. 119(a) to Patent Application No. 10-2010-0040591 filed in Republic of Korea on Apr. 30, 2010, all of which are hereby expressly incorporated by reference into the present application.

TECHNICAL FIELD

The present invention relates to wireless communication, and more particularly, to a method and apparatus for transmitting a frame in a WLAN system.

BACKGROUND ART

With the recent development of information communication technology, a variety of wireless communication techniques are being developed. From among them, a WLAN is a technique which enables wireless access to the Internet at home or companies or in a specific service providing area using mobile terminals, such as a Personal Digital Assistant (PDA), a laptop computer, and a Portable Multimedia Player (PMP), on the basis of radio frequency technology.

Since Institute of Electrical and Electronics Engineers (IEEE) 802 (i.e., the standard organization of WLAN technology) has been set up on February, 1980, lots of standardization tasks are being performed.

The initial WLAN technology was able to support the bit rate of 1 to 2 Mbps through frequency hopping, band spreading, and infrared communication using a 2.4 GHz frequency band in accordance with IEEE 802.11, but the recent WLAN technology can support the maximum bit rate of 54 Mbps using Orthogonal Frequency Division Multiplex (OFDM). In addition, in the IEEE 802.11, the standardization of various techniques, such as the improvements of Quality of Service (QoS), the compatibility of Access Point (AP) protocols, security enhancement, radio resource measurement, wireless access vehicular environment for vehicle environments, fast roaming, a mesh network, interworking with an external network, and wireless network management, is put to practical use or being developed.

IEEE 802.11b of the IEEE 802.11 supports a maximum transmission speed of 11 Mbps while using the 2.4 GHz frequency band. IEEE 802.11 a commercialized after the IEEE 802.11 b has reduced the influence of interference as compared with the very complicated 2.4 GHz frequency band by using a 5 GHz frequency band not the 2.4 GHz frequency band and also improved the transmission speed up to a maximum of 54 Mbps using the OFDM technique. However, the IEEE 802.11a is disadvantageous in that the communication distance is shorter than that of the IEEE 802.11 b. Further, IEEE 802.11g implements a maximum communication speed of 54 Mbps using the 2.4 GHz frequency band like the IEEE 802.11b and satisfies backward compatibility. The IEEE 802.11g is being in the spotlight and superior to the IEEE 802.11a even in the communication distance.

Further, as a technique for overcoming limits to the communication speed pointed out as vulnerabilities in the WLAN, there is IEEE 802.11n which has recently been standardized. The IEEE 802.11n has its object to increase the speed and reliability of a network and to expand the operating distance of a wireless network. More particularly, the IEEE 802.11n is based on a Multiple Inputs and Multiple Outputs (MIMO) technique using multiple antennas on both sides of a transmitter and a receiver in order to support a High Throughput (HT) having a data processing speed of 540 Mbps or higher, minimize transmission error, and optimize the data rate. Further, the IEEE 802.11n may use not only a coding method of transmitting several redundant copies in order to increase data reliability, but also an OFDM (Orthogonal Frequency Division Multiplex) method in order to increase the data rate.

With the WLAN being widely spread and applications using the WLAN becoming diverse, a need for a new WLAN system capable of supporting a higher throughput than the data processing speed supported by the IEEE 802.11n is recently gathering strength. A Very High Throughput (VHT) WLAN system is one of IEEE 802.11 WLAN systems which have recently been proposed in order to support a data processing speed of 1 Gbps or higher. The name 'VHT WLAN system' is arbitrary. A feasibility test for a system using 8×8 MIMO and a channel bandwidth of 80 MHz or higher so as to provide the throughput of 1 Gbps or higher is in progress.

Here, a WLAN system using a channel bandwidth of 80 MHz or higher must take compatibility with stations in accordance with the IEEE 802.11 a/b/g standards using the channel bandwidth of 20 MHz and stations in accordance with the IEEE 802.11n standard using a channel bandwidth of 20 MHz or 40 MHz into consideration. Hereinafter, a station of a WLAN system using the channel bandwidth of 20 MHz or 40 MHz, including stations supporting the IEEE 802.11 a/b/g/n standards, is referred to a legacy station. For the purpose of compatibility and coexistence with a legacy station, when a VHT station transmits data using a channel bandwidth of 80 MHz or higher, information for the legacy station can be transmitted in the unit of 20 MHz so that the legacy station can recognize the data. However, in case where the same transmission signal of the 20 MHz unit is included, a Peak to Average Power Ratio (PAPR) can be increased on the transmission side. A signal having a high PAPR is problematic in that it increases the cost for implementation because a more complicated power amplifier is required. Accordingly, in a system using the channel bandwidth of 80 MHz, a method of lowering the PAPR of a transmission signal while guaranteeing coexistence with a legacy station must be taken into account.

SUMMARY OF INVENTION

Technical Problem

It is an object of the present invention to provide a method of transmitting a frame in a WLAN system which transmits data through a plurality of frequency blocks.

It is another object of the present invention to provide a method and apparatus for guaranteeing coexistence with a legacy system in a system which transmits data through a plurality of frequency blocks.

Solution to Problem

In an aspect of present invention, a method of transmitting data in a WLAN system using a transmission frequency band including a plurality of frequency blocks includes generating a transmission information field, including at least one of information for timing acquisition of a frame, channel estimation information, and information for demodulation and decoding of the data, generating a plurality of transformed transmission information fields by multiplying the transmission information field by a transform sequence, and transmitting the plurality of transformed transmission information fields through the plurality of respective frequency blocks, wherein the transform sequence comprises a plurality of transform values, and the plurality of transformed transmission information fields is generated by multiplying transmission information field by each of a plurality of transform values.

Each of the frequency blocks may have a bandwidth of 20 MHz, and the transmission frequency band may have a bandwidth of 80 MHz.

The transform sequence may be {1, j, −1, −j}.

The transform sequence may be {+1, −1, −1, −1}.

Each of the frequency blocks may have a bandwidth of 40 MHz, and the transmission frequency band may have a bandwidth of 80 MHz.

Each of the frequency blocks may have a bandwidth of 80 MHz, and the transmission frequency band may have a bandwidth of 160 MHz.

In another aspect of the present invention, a method of transmitting data in a WLAN system using a transmission frequency band including a plurality of frequency blocks includes generating a transmission information field, including at least one of information for timing acquisition of a frame, channel estimation information, and information for demodulation and decoding of the data, generating a plurality of transformed transmission information fields by multiplying the transmission information field by a transform sequence, and transmitting the plurality of transformed transmission information fields in the plurality of respective frequency blocks using a plurality of transmit chains, wherein the transform sequence comprises a plurality of transform values, and the plurality of transformed transmission information fields is generated by multiplying transmission information field by each of a plurality of transform values.

The frequency block may have a bandwidth of 20 MHz, and the transmission frequency band may have a bandwidth of 80 MHz.

A different Cyclic Shift Delay (CSD) value may be applied to each of the frequency blocks and each of the transmit chains.

The transform sequence may be {1, j, −1, −j}.

The transform sequence may be {+1, −1, −1, −1}.

The frequency block may have a bandwidth of 80 MHz, and the transmission frequency band may have a bandwidth of 160 MHz.

Bandwidth of the frequency block may be half of the transmission frequency band's bandwidth, and a different Cyclic Shift Delay (CSD) value may be applied to each of the frequency blocks and each of the transmit chains.

A CSD value applied to first frequency block may be 0 ns, and a CSD value applied to second frequency block may be −25 ns or −800 ns.

In still another aspect of the present invention, a station for transmitting data using a transmission frequency band including a plurality of frequency blocks includes a processor configured to generate a radio frame, and a transceiver functionally connected to the processor and configured to transmit the radio frame, wherein the processor is configured to generate a transmission information field, including at least one of information for timing acquisition of a frame, channel estimation information, and information for demodulation and decoding of the data, and to generate a plurality of transformed transmission information fields by multiplying the transmission information field by a transform sequence, and the transceiver is configured to transmit the plurality of transformed transmission information fields through the plurality of respective frequency blocks.

Advantageous Effects of Invention

In accordance with the present invention, the complexity and implementation cost of a station can be reduced by improving the characteristic of a transmission signal. Further, transmission efficiency can be increased, and coexistence between a station using a channel bandwidth of 80 MHz or higher and a legacy station using the channel bandwidth of 20 MHz can be guaranteed.

BRIEF DESCRIPTION OF DRAWINGS

FIG. 1 is a diagram showing an example of a WLAN system to which an embodiment of the present invention can be applied.

FIG. 2 is a block diagram showing an example of a PLCP frame format.

FIG. 3 is a block diagram schematically showing a frequency channel which can be used by an 802.11 STA for data transmission/reception.

FIG. 4 shows an example of transmission according to an embodiment of the present invention.

FIG. 5 is a diagram seen from a viewpoint of a station which transmits and receives data in the unit of 40 MHz in the case of the transmission according to the example of FIG. 4.

FIG. 6 is a conceptual diagram showing an embodiment of the present invention using Cyclic Shift Delay (CSD) in order to reduce the PAPR.

FIG. 7 shows an example of the transmission of a frame according to an embodiment of the present invention.

FIGS. 8 and 9 illustrate a method of transmitting a frame according to embodiments of the present invention.

FIGS. 10 to 13 show examples of the application of CSD according to some embodiments of the present invention.

FIG. 14 is a block diagram showing a wireless apparatus in which the embodiments of the present invention can be implemented.

MODE FOR THE INVENTION

Hereinafter, some embodiments of the present invention are described in detail with reference to the accompanying drawings. The following embodiments can be usefully applied to a Very High Throughput (VHT) WLAN system using a channel bandwidth of 80 MHz, but not limited thereto. For example, the embodiments of the present invention can also be applied to a WLAN system using a channel bandwidth, exceeding 40 MHz or 80 MHz and including a plurality of channel blocks.

FIG. 1 is a diagram showing an example of a WLAN system to which an embodiment of the present invention can be applied. The WLAN system according to the example of FIG. 1 is a Very High Throughput (VHT) WLAN system.

Referring to FIG. 1, the WLAN system, such as a VHT WLAN system, includes one or more Basic Service Sets (hereinafter referred to as a 'BSS'). The BSS is a set of STAtions (hereinafter referred to as an 'STA') which can communicate with each other through successful synchronization. The BSS is not a concept indicating a specific area. Further, as in a WLAN system to which an embodiment of the present invention can be applied, a BSS supporting ultra-high data processing of 1 GHz or higher at the MAC Service Access Point (SAP) is referred to as a VHT BSS.

The VHT BSS can be classified into an infrastructure BSS and an Independent BSS (hereinafter referred to as an 'IBSS'). An infrastructure BSS is shown in FIG. 1. The infrastructure BSS BSS1 and BSS2 includes one or more Non-AP STAs STA 1, STA 3, and STA 4, Access Points AP 1 (STA 2) and AP 2(STA 5) providing distribution service, and a Distribution System (hereinafter referred to as a 'DS') interconnecting the plurality of APs AP 1 and AP 2. In the infrastructure BSS, an AP STA manages the Non-AP STAs of the BSS.

On the other hand, the IBSS (i.e., the independent BSS) is a BSS operating in the adhoc mode. The IBSS does not include a centralized management entity, performing a management function at the center, because it does not include an AP VHT STA. That is, in the IBSS, Non-AP STAs are managed in a distributed manner. Further, in the IBSS, all STAs can be composed of mobile STAs, and they form a self-contained network because access to a DS is not permitted.

An STA includes both an AP (i.e., in a broad sense) and a Non-AP STA which are certain function media, including a Medium Access Control (MAC) layer and a physical layer interface for a radio medium in accordance with the IEEE 802.11 standard. Further, in a multi-channel environment to be described later, an STA supporting ultra-high data processing of 1 GHz or higher is referred to as a VHT STA. In a VHT WLAN system to which an embodiment of the present invention can be applied, all STAs included in the above BSS can be VHT STAs, or VHT STAs and legacy STAs (e.g., HT STAs in accordance with the IEEE 802.11n standard) can coexist in the STAs included in the above BSS.

An STA for wireless communication includes a processor and a transceiver and further includes a user interface, display means, etc. The processor is a function unit configured to generate a frame which will be transmitted over a wireless network or to process a frame received over the wireless network. The processor performs various functions for controlling the STA. Further, the transceiver is functionally connected to the processor and configured to transmit and receive a frame over the wireless network for the STA.

A portable terminal used by a user, from among STAs, corresponds to a Non-AP STA (e.g., STA1, STA3, STA4, and STA5). If an STA can be simply referred as a Non-AP STA. The Non-AP STA may also be referred to as another terminology, such as a terminal, a Wireless Transmit/Receive Unit (WTRU), a User Equipment (UE), a Mobile Station (MS), a mobile terminal, or a mobile subscriber unit. Further, in a multi-channel environment to be described later, a Non-AP STA supporting ultra-high data processing of 1 GHz or higher is referred to as a Non-AP VHT STA or simply a VHT STA.

Further, the APs AP1 and AP2 are function entities providing access to the DS via a radio medium for STAs (i.e., association STAs) associated therewith. In an infrastructure BSS including an AP, communication between Non-AP STAs is performed via the AP in principle. In case where a direct link is set up, communication can be directly performed between Non-AP STAs. The AP may also be referred to as a concentrated controller, a Base Station (BS), a node-B, a Base Transceiver System (BTS), or a site controller. Further, in a multi-channel environment to be described later, an AP supporting ultra-high data processing of 1 GHz or higher is referred to as a VHT AP.

A plurality of infrastructure BSSs can be interconnected through a DS (Distribution System). The plurality of BSSs interconnected through the DS is called an Extended Service Set (ESS). STAs included in the ESS can communicate with each other. Non-AP STAs can continue to communicate with each other within the same ESS and move from one BSS to another BSS.

The DS is a mechanism for enabling one AP to communicate with another AP. According to the mechanism, an AP can transmit a frame to STAs which are managed by the AP and connected to a BSS, can transfer a frame to any one STA in case where the STA has moved to another BSS, or can transfer a frame over an external network, such as a wired network. The DS needs not to be necessarily a network, and it can have any type as long as it can provide predetermined distribution service regulated in the IEEE 802.11 standard. For example, the DS may be a wireless network, such as a mesh network, or a physical structure for interconnecting APs.

In a VHT WLAN system, an STA can transmit and receive data using a channel having a bandwidth of 80 MHz. It is hereinafter assumed that an STA supporting IEEE 802.11a, IEEE 802.11b, IEEE 802.11g, etc. is a Non-HT STA, an STA supporting IEEE 802.11n is an HT STA, and a Non-HT STA and an HT STA are collectively referred to as a legacy STA.

Further, it is assumed that the transmission and reception of data using a channel having a bandwidth of N MHz is called N MHz data transmission/reception. In other words, in case where data are transmitted using a channel having a bandwidth of 80 MHz, it is referred to as '80 MHz data transmission'. In case where data are received using a channel having a bandwidth of 40 MHz, it is referred to as '40 MHz data reception'. In case where data are transmitted and received using a channel having a bandwidth of 20 MHz, it is referred to as '20 MHz data transmission/reception'.

FIG. 2 is a block diagram showing an example of a PLCP frame format.

A Non-HT PLCP frame 210 is an example of a PLCP frame format supporting a Non-HT STA. The Non-HT PLCP frame 210 includes a Non-HT Short Training Field (L-STF) 211, a Non-HT Long Training Field (L-LTF) 212, a Non-HT Signal Field (L-SIG) 213, and a data field Data 219. The L-STF 211 is used for frame timing acquisition and Automatic Gain Control (AGC) convergence. The L-LTF 212, together with the L-SIG 213, is used for channel estimation for demodulating data. The L-SIG 213 includes information for demodulating and decoding subsequent data.

An HT-GF PLCP frame 230 is an example of a PLCP frame format efficiently designed in an HT STA which is used in a system consisting of only HT STAs supporting IEEE 802.11n. In the HT-GF PLCP frame, an HT Green Field Short Training Field (HT-GF-STF) 231, an HT Long Training Field (HT-LTF) 232, an HT Signal Field (HT-SIG) 234, and a data field Data are sequentially transmitted. The HT-GF-STF 231 is used for frame timing acquisition, AGC convergence, and diversity selection. The HT-LTF 232, together with the HT-SIG 234, is used to perform channel estimation for demodulating data. The HT-SIG 234 includes information for demodulating and decoding data.

An HT-Mixed PLCP frame 250 is an example of a PLCP frame format designed to support HT STAs in a system in which a Non-HT STA and an HT STA coexist. The HT-Mixed PLCP frame 250 includes an L-STF 251, an L-LTF 252, and an L-SIG 253 so that Non-HT STAs supporting IEEE 802.11 a/b/g can understand the HT-Mixed PLCP frame 250. Here, the L-STF 251, the L-LTF 252, and the L-SIG 253 are first transmitted. After the L-STF 251, the L-LTF 252, and the L-SIG 253 are transmitted, an HT-Signal Field (HT-SIG) 254 is transmitted which includes information necessary to demodulate and decode data transmitted for HT STAs. Information is transmitted without precoding up to the HT-SIG 254 so that a variety of STAs, including Non-HT STAs, can receive the information, and HT-LTFs and data transmitted after the HT-SIG 254 are precoded and transmitted. Here, an HT Short Training Field (HT-STF) 255 is transmitted so that an STA, precoding and receiving data, can take parts, having varying power resulting from the precoding, into consideration, and HT-LTFs 256 and a data field Data 259 are then transmitted.

As described above, an HT STA supporting IEEE 802.11n can transmit data using a channel having a bandwidth of 20 MHz and a channel having a bandwidth of 40 MHz. A Non-HT STA can perform 20 MHz data transmission. In the case in which a Non-HT STA and an HT STA coexist, if the HT STA performs 40 MHz data transmission, the Non-HT STA connected to another AP and configured to perform data transmission/reception is configured to check the corresponding data transmission and not to transmit a signal during the time for which the corresponding data transmission is performed.

FIG. 3 is a block diagram schematically showing a frequency channel which can be used by an 802.11 STA for data transmission/reception.

In the example of FIG. 3, the channel consists of four frequency blocks, each having a bandwidth of 20 MHz. Each of a frequency block A 310, a frequency block B 320, a frequency block C 330, and a frequency block D 340 has the bandwidth of 20 MHz and can function as one channel in 20 MHz data transmission. In the example of FIG. 3, although the frequency blocks are illustrated to be consecutive to each other, they are only illustrative. For example, the frequency blocks may not be consecutive.

When an STA performs 20 MHz data transmission in any one of the frequency block A to the frequency block D of FIG. 3 using a PLCP frame format which can be recognized by all Non-HT STA, HT-STA, and VHT-STA, all the Non-HT STA, HT-STA, and VHT-STA can normally recognize the 20 MHz data transmission and operate. However, if an STA transmits an 80 MHz preamble while performing 80 MHz data transmission/reception using all the frequency block A, the frequency block B, the frequency block C, and the frequency block D, there is a possibility that a legacy STA, performing signal processing using only the 20 MHz or 40 MHz unit, does not normally decode the data and can malfunction.

In order to solve the problem, in case where 80 MHz data transmission/reception is performed, a part which can be heard (recognized) by a legacy STA in the unit of four 20 MHz frequency blocks or a field (e.g., the L-STF, L-LTF, the L-SIG, the HT-SIG, the HT-LTF or the HT-SIG of FIG. 2), including information for a legacy STA, can be transmitted. Here, in the case in which a Non-HT STA is not supported and only an HT STA is sought to be supported, an 80 MHz frequency band can be transmitted as information (e.g., the HT-SIG, the HT-LTF, or the HT-SIG of FIG. 2) for the HT STA every two frequency blocks (i.e., 40 MHz unit).

It can be seen that a field, including information for a legacy STA (hereinafter referred to as a 'transmission information field'), is transmitted in the unit of 20 MHz (or 40 MHz) and thus a corresponding frequency block is used through the transmission information field which can be recognized by the legacy STA, processing signals in the unit of 20 MHz, in each frequency block. The transmission information field can be set to include some of or all the L-STF, L-LTF, the L-SIG, the HT-SIG, the HT-LTF, and the HT-SIG at need.

However, in the case in which the transmission information field for a legacy STA is transmitted every frequency block of 20 MHz, a PAPR (Peak to Average Power Ratio) may become problematic. In case where the transmission information fields transmitted in frequency blocks are the same, the PAPR of a signal can be increased. With an increase of the PAPR of a signal, a more complicated Power Amplifier (PA) is required. A complicated PA increases the cost for implementation. Accordingly, it is efficient to design a signal having a PAPR as low as possible.

The present invention proposes a method of configuring a transmission signal in order to efficiently support a combination in a system having a combination of a legacy STA, supporting 20 MHz or 40 MHz transmission, and a VHT STA supporting 80 or 160 MHz transmission.

In accordance with an embodiment of the present invention, in case where repetitive transmission signals are transmitted in different frequency blocks, each of the transmission signals transmitted through the respective frequency blocks is multiplied by a transform value and transmitted in order to lower the PAPR. Here, the transform value is a predetermined complex value, and the transmission signal can include only the transmission information field or both the transmission information field and a data field. The multiplication of the transform value can refer to the scrambling, masking, or phase shift of the transmission signal. The reason why the transmission signal is multiplied by the transform value in each frequency block in order to lower the PAPR of the transmission signal and then transmitted is to make the transmission signals of the respective frequency blocks different signals through phase shift, etc.

Even though all signals transmitted and received are multiplied by a specific complex value, if a preamble for channel estimation is multiplied by the same complex value, an STA processing a signal in the unit of 20 MHz frequency block considers the multiplied value as part of a simple channel coefficient and does not actually recognize that any complex value has been multiplied. In other words, the STA can operate irrespective of whether which complex value has been multiplied.

In accordance with an embodiment of the present invention, in an environment in which a legacy STA, performing transmission and reception using a channel having a bandwidth of 20 MHz or 40 MHz, and a VHT STA coexist, transmission/reception can be performed using a channel having a bandwidth of 80 MHz.

In accordance with an embodiment of the present invention, in a system using a frequency bandwidth of 80 MHz, frequency blocks are sequentially multiplied by a transform sequence of $\{+1, +j, a, a^*j\}$, respectively, starting from a 20 MHz frequency block having a low frequency band, and then transmitted. For example, in the example of FIG. 3, the frequency block A 310 can be multiplied by the transform value +1, the frequency block B 320 can be multiplied by the transform value +j, the frequency block C 330 can be multiplied by the transform value a, and the frequency block D 340 can be multiplied by the transform value aj, and the frequency blocks A, B, C, and D are then transmitted. Here, a can be a predetermined complex value.

FIG. 4 shows an example of transmission according to an embodiment of the present invention.

The example of FIG. 4 illustrates a case in which a predetermined complex value a is −1. A transmission STA sequentially multiplies signals by a transform sequence of {+1, +j, −1, −j}, respectively, starting from a low frequency block, and then transmits the signals. That is, the transmission STA multiplies a frequency block A 410 by the transform value +1, a frequency block B 420 by the transform value +j, a frequency block C 430 by the transform value −1, and a frequency block D 440 by the transform value −j and then transmits the signals.

An STA which supports transmission and reception using a channel having a bandwidth of 20 MHz recognizes the transform value +1, the transform value +j, the transform value −1, and the transform value −j multiplied as described above, as only channel coefficients. Accordingly, as compared with a case in which the transform values are not multiplied, there is no change in the transmission/reception process.

FIG. 5 is a diagram seen from a viewpoint of an STA which transmits and receives data in the unit of 40 MHz in the case of the transmission according to the example of FIG. 4.

An STA configured to transmit and receive data in the unit of 40 MHz can transmit and receive data at a total of three locations (i.e., a frequency block A+a frequency block B (510), a frequency block B+a frequency block C (520), and a frequency block C+a frequency block D (530)) within an 80 MHz frequency. In the frequency domain enabling transmission and reception, a signal can be able to be transmitted and received in the same manner as the existing transmission method. If the transform sequence multiplied to the 20 MHz frequency blocks consist of {+1, +j, −1, −j} as in the example of FIG. 5, {+1, +j} can be always multiplied in the unit of 20 MHz from a standpoint of each of the 40 MHz blocks 510, 520, and 530 within the 80 MHz frequency band.

When a signal is transmitted in the first 40 MHz (i.e., A+B, 510) in which 40 MHz transmission and reception is possible, {+1,+j} will be received in the 20 MHz frequency block unit. When transmission is performed in the second 40 MHz (i.e., B+C, 520), (+j)·{+1,+j} will be received in the 20 MHz frequency block unit. However, the value +j multiplied to the entire 40 MHz is recognized as some of channel coefficients, and thus a normal operation can be performed. In the third 40 MHz (i.e., C+D, 530), a signal is multiplied by (−1)·{+1, +j} in the 20 MHz frequency block unit as in the second transmission block. It results in a transparent transmission method from a viewpoint of the 40 MHz.

From a viewpoint of an STA transmitting and receiving 80 MHz as described above, although the entire 80 MHz signal is multiplied by a predetermined complex value, the characteristic of transmission and reception is not changed. Accordingly, although the transform sequence of {+1, +j, −1, −j} is multiplied by a predetermined complex value b, the transmission and reception characteristic is not changed. For example, a sequence of {−1, −j, 1, +j} may be used instead of the sequence of {+1, +j, −1, −j}, and a sequence of {+j, −1, −j, +1} or {−j, +1, +j, −1} may be used instead of the sequence of {+1, +j, −1, −j}.

Tables 1 to 4 below show simulation results for finding values for minimizing the PAPR in the 20 MHz frequency block of FIG. 3. Here, in the PAPR, a ratio of a peak power versus an average power of 99.9% is represented by dB (decibel). The PAPR was measured for all the L-LTF and L-STF signals because a different value can be obtained depending on a signal for which the PAPR is measured. Further, since the PAPR can vary depending on whether a signal is oversampled or not, all the results of a case where the signal was oversampled and a case where the signal was not oversampled were simulated.

Table 1 shows simulation results for an oversampled L-LTF signal.

TABLE 1

| PAPR [dB] | Block A | Block B | Block C | Block D |
|---|---|---|---|---|
| 5.4301 | +1 | +1 | −1 | +1 |
| 5.4566 | +1 | −1 | +1 | +1 |
| 5.5931 | +1 | −j | +1 | +j |
| 5.6875 | +1 | +j | +1 | −j |
| 5.7521 | +1 | −j | −1 | −j |
| 5.7891 | +1 | +j | −j | −1 |
| 5.7952 | +1 | −j | +j | −1 |
| 5.8483 | +1 | +j | −1 | +j |
| 5.8932 | +1 | −1 | −j | −j |
| 5.9125 | +1 | +1 | +1 | −1 |
| 5.9224 | +1 | +1 | −j | +j |
| 5.9479 | +1 | −1 | +j | +j |
| 5.9848 | +1 | +1 | +j | −j |
| 5.9900 | +1 | −1 | −1 | −1 |
| 6.0280 | +1 | −j | −j | +1 |
| 6.0312 | +1 | +j | +j | +1 |
| 6.5127 | +1 | −1 | −1 | +1 |
| 6.7071 | +1 | −j | +1 | −1 |
| 6.7358 | +1 | −1 | −j | −1 |
| 6.7577 | +1 | +1 | −1 | +j |
| 6.7618 | +1 | +1 | −1 | −j |
| 6.8358 | +1 | +j | +1 | −1 |
| 6.8659 | +1 | −1 | −1 | +j |
| 6.8787 | +1 | +j | −j | −j |
| 6.8914 | +1 | −1 | −1 | −j |
| 6.9107 | +1 | −1 | +j | −1 |
| 6.9289 | +1 | −j | −j | +j |
| 6.9333 | +1 | −j | +j | +j |
| 6.9355 | +1 | +1 | −1 | −1 |
| 6.9703 | +1 | +j | +1 | +j |
| 6.9720 | +1 | +j | +j | −j |
| 7.0569 | +1 | −j | +1 | −j |
| 7.1838 | +1 | +1 | −j | +1 |
| 7.1838 | +1 | +j | +1 | +1 |
| 7.1838 | +1 | +1 | +j | +1 |
| 7.1838 | +1 | −j | +1 | +1 |
| 7.8875 | +1 | −1 | −j | +1 |
| 7.8996 | +1 | +j | −1 | +1 |
| 7.9107 | +1 | −1 | +j | +1 |
| 7.9200 | +1 | −j | −1 | +1 |
| 7.9488 | +1 | −1 | +1 | −j |
| 7.9670 | +1 | −1 | +1 | +j |
| 8.0178 | +1 | −j | +j | −j |
| 8.0315 | +1 | +j | −j | +j |
| 8.1894 | +1 | −j | −1 | −1 |
| 8.2016 | +1 | −1 | +j | −j |
| 8.2238 | +1 | +j | −j | +1 |
| 8.2443 | +1 | −j | +j | +1 |
| 8.246 | +1 | −1 | −j | +j |
| 8.3165 | +1 | +1 | −j | −1 |
| 8.3628 | +1 | +1 | +1 | +j |
| 8.4007 | +1 | +1 | +1 | −j |
| 8.4078 | +1 | +j | −1 | −1 |
| 8.5135 | +1 | +1 | +j | −1 |
| 8.5434 | +1 | +j | +j | +j |
| 8.5539 | +1 | −j | −j | −j |
| 8.6039 | +1 | −j | −j | −1 |
| 8.7036 | +1 | +1 | −j | −j |
| 8.7414 | +1 | +1 | +j | +j |
| 8.7498 | +1 | −1 | +1 | −1 |
| 8.7570 | +1 | +j | −1 | −j |
| 8.7720 | +1 | −j | −1 | +j |
| 8.7909 | +1 | +j | +j | −1 |
| 9.0609 | +1 | +1 | +1 | +1 |

Table 2 shows simulation results for a non-oversampled L-LTF signal.

TABLE 2

| PAPR [dB] | Block A | Block B | Block C | Block D |
|---|---|---|---|---|
| 3.1843 | +1 | +1 | −1 | +1 |
| 3.1843 | +1 | −1 | +1 | +1 |
| 3.3110 | +1 | +j | +1 | −j |
| 3.3359 | +1 | −j | +1 | +j |
| 3.6932 | +1 | +1 | +1 | −1 |
| 3.7291 | +1 | −j | −1 | −j |
| 3.7508 | +1 | +j | −1 | +j |
| 3.8857 | +1 | −1 | −1 | −1 |
| 5.7974 | +1 | +j | −j | +1 |
| 5.8012 | +1 | −1 | −1 | +1 |
| 5.8272 | +1 | −j | +j | +1 |
| 5.8521 | +1 | −1 | +j | −j |
| 5.8759 | +1 | −1 | −j | +j |
| 5.9423 | +1 | +j | +j | −1 |
| 5.9463 | +1 | +1 | −1 | −1 |
| 5.9735 | +1 | −j | −j | −1 |
| 6.0414 | +1 | +1 | +j | −j |
| 6.0699 | +1 | −1 | −j | −j |
| 6.0929 | +1 | +1 | −j | +j |
| 6.1246 | +1 | −1 | +j | +j |
| 6.1837 | +1 | +j | −j | −1 |
| 6.1869 | +1 | −j | +j | −1 |
| 6.2091 | +1 | +j | +j | +1 |
| 6.2091 | +1 | −j | −j | +1 |
| 6.4130 | +1 | −j | +1 | −j |
| 6.4159 | +1 | +1 | −j | −j |
| 6.4357 | +1 | +j | +1 | +j |
| 6.4386 | +1 | +1 | +j | +j |
| 6.7609 | +1 | +j | −1 | +1 |
| 6.7609 | +1 | −1 | −j | +1 |
| 6.7908 | +1 | −j | −1 | +1 |
| 6.7908 | +1 | −1 | +j | +1 |
| 6.8744 | +1 | +1 | −1 | −j |
| 6.8752 | +1 | +j | +j | −j |
| 6.8776 | +1 | −1 | −1 | −j |
| 6.8787 | +1 | +j | −j | −j |
| 6.9097 | +1 | −1 | −j | −1 |
| 6.9107 | +1 | −1 | +j | −1 |
| 6.9126 | +1 | +j | +1 | −1 |
| 6.9148 | +1 | −j | +1 | −1 |
| 6.9258 | +1 | +1 | −1 | +j |
| 6.9289 | +1 | −j | −j | +j |
| 6.9313 | +1 | −1 | −1 | +j |
| 6.9333 | +1 | −j | +j | +j |
| 7.0112 | +1 | −1 | +1 | −j |
| 7.0128 | +1 | −j | +j | −j |
| 7.0344 | +1 | +j | −j | +j |
| 7.0360 | +1 | −1 | +1 | +j |
| 7.0409 | +1 | +j | −1 | −1 |
| 7.0539 | +1 | +1 | +j | −1 |
| 7.0729 | +1 | −j | −1 | −1 |
| 7.0828 | +1 | +1 | −j | −1 |
| 7.1838 | +1 | +1 | +j | +1 |
| 7.1838 | +1 | +1 | −j | +1 |
| 7.1838 | +1 | +j | +1 | +1 |
| 7.1838 | +1 | −j | +1 | +1 |
| 7.2092 | +1 | +1 | +1 | −j |
| 7.2320 | +1 | +1 | +1 | +j |
| 7.4829 | +1 | −j | −j | −j |
| 7.5056 | +1 | +j | +j | +j |
| 8.7648 | +1 | +j | −1 | −j |
| 8.8481 | +1 | −j | −1 | +j |
| 8.8729 | +1 | −1 | +1 | −1 |
| 9.2451 | +1 | +1 | +1 | +1 |

Table 3 shows simulation results for an oversampled L-STF signal.

TABLE 3

| PAPR [dB] | Block A | Block B | Block C | Block D |
|---|---|---|---|---|
| 4.5471 | +1 | −j | +1 | +j |
| 4.5471 | +1 | +j | −1 | +j |
| 4.5471 | +1 | −j | −1 | −j |
| 4.5471 | +1 | +j | +1 | −j |
| 4.5562 | +1 | +1 | +1 | −1 |
| 4.5562 | +1 | −1 | −1 | −1 |
| 4.6802 | +1 | +1 | −1 | +1 |
| 4.6802 | +1 | −1 | +1 | +1 |
| 4.7126 | +1 | +j | −j | −1 |
| 4.7126 | +1 | −j | +j | −1 |
| 5.0997 | +1 | −j | −j | +1 |
| 5.0997 | +1 | +j | +j | +1 |
| 5.2497 | +1 | +1 | +j | −j |
| 5.2497 | +1 | −1 | −j | −j |
| 5.2497 | +1 | +1 | −j | +j |
| 5.2497 | +1 | −1 | +j | +j |
| 5.8219 | +1 | +j | +1 | +j |
| 5.8219 | +1 | −j | +1 | −j |
| 5.8847 | +1 | +1 | −1 | −1 |
| 5.9298 | +1 | −1 | +j | −1 |
| 5.9298 | +1 | −j | +1 | −1 |
| 5.9298 | +1 | +j | +1 | −1 |
| 5.9298 | +1 | −1 | −j | −1 |
| 5.9681 | +1 | −1 | −1 | +1 |
| 6.1805 | +1 | +1 | +j | +1 |
| 6.1805 | +1 | +1 | −j | +1 |
| 6.1805 | +1 | +j | +1 | +1 |
| 6.1805 | +1 | −j | +1 | +1 |
| 6.2891 | +1 | −j | −j | +j |
| 6.2891 | +1 | +j | +j | −j |
| 6.2891 | +1 | −1 | −1 | +j |
| 6.2891 | +1 | −1 | −1 | −j |
| 6.3310 | +1 | +j | −j | −j |
| 6.3310 | +1 | +1 | −1 | +j |
| 6.3310 | +1 | +1 | −1 | −j |
| 6.3310 | +1 | −j | +j | +j |
| 7.1946 | +1 | −1 | +1 | −j |
| 7.1946 | +1 | −j | +j | −j |
| 7.1946 | +1 | +j | −j | +j |
| 7.1946 | +1 | −1 | +1 | +j |
| 7.2565 | +1 | +1 | +1 | +j |
| 7.2565 | +1 | +1 | +1 | −j |
| 7.2565 | +1 | +j | +j | +j |
| 7.2565 | +1 | −j | −j | −j |
| 7.3192 | +1 | +1 | +j | −1 |
| 7.3192 | +1 | +j | −1 | −1 |
| 7.3192 | +1 | +1 | −j | −1 |
| 7.3192 | +1 | −j | −1 | −1 |
| 7.4026 | +1 | +j | −1 | +1 |
| 7.4026 | +1 | −1 | +j | +1 |
| 7.4026 | +1 | −1 | −j | +1 |
| 7.4026 | +1 | −j | −1 | +1 |
| 7.5374 | +1 | +1 | −j | −j |
| 7.5374 | +1 | +1 | +j | +j |
| 7.5416 | +1 | −1 | +j | −j |
| 7.5416 | +1 | −1 | −j | +j |
| 7.5507 | +1 | −j | −j | −1 |
| 7.5507 | +1 | +j | +j | −1 |
| 7.6747 | +1 | +j | −j | +1 |
| 7.6747 | +1 | −j | +j | +1 |
| 7.7229 | +1 | −1 | +1 | −1 |
| 8.1100 | +1 | +1 | +1 | +1 |
| 8.2600 | +1 | +j | −1 | −j |
| 8.2600 | +1 | −j | −1 | +j |

Table 4 shows simulation results for a non-oversampled L-STF signal.

TABLE 4

| PAPR [dB] | Block A | Block B | Block C | Block D |
|---|---|---|---|---|
| 2.2394 | +1 | +1 | −1 | +1 |
| 2.2394 | +1 | −1 | −1 | −1 |
| 2.2394 | +1 | +1 | +1 | −1 |
| 2.2394 | +1 | +j | +1 | −j |
| 2.2394 | +1 | +j | −1 | +j |
| 2.2394 | +1 | −1 | +1 | +1 |
| 2.2394 | +1 | −j | +1 | +j |
| 2.2394 | +1 | −j | −1 | −j |

TABLE 4-continued

| PAPR [dB] | Block A | Block B | Block C | Block D |
|---|---|---|---|---|
| 4.7126 | +1 | −1 | +j | −j |
| 4.7126 | +1 | −1 | −j | +j |
| 4.7126 | +1 | +j | −j | −1 |
| 4.7126 | +1 | −j | +j | −1 |
| 5.0997 | +1 | +j | +1 | +j |
| 5.0997 | +1 | +j | +j | +1 |
| 5.0997 | +1 | −j | +1 | −j |
| 5.0997 | +1 | −j | −j | +1 |
| 5.0997 | +1 | +1 | +j | +j |
| 5.0997 | +1 | +1 | −j | −j |
| 5.2497 | +1 | +1 | +j | −j |
| 5.2497 | +1 | +j | +j | −1 |
| 5.2497 | +1 | +j | −j | +1 |
| 5.2497 | +1 | −1 | −j | −j |
| 5.2497 | +1 | +1 | −j | +j |
| 5.2497 | +1 | −1 | +j | +j |
| 5.2497 | +1 | −j | +j | +1 |
| 5.2497 | +1 | −j | −j | −1 |
| 5.2497 | +1 | −1 | −1 | +1 |
| 5.2497 | +1 | +1 | −1 | −1 |
| 5.6817 | +1 | +j | −j | +j |
| 5.6817 | +1 | −1 | +1 | −j |
| 5.6817 | +1 | −1 | +j | −1 |
| 5.6817 | +1 | −j | +1 | −1 |
| 5.6817 | +1 | +j | +1 | −1 |
| 5.6817 | +1 | −1 | +1 | +j |
| 5.6817 | +1 | −1 | −j | −1 |
| 5.6817 | +1 | −j | +j | −j |
| 6.0688 | +1 | +1 | +1 | +j |
| 6.0688 | +1 | +j | +1 | +1 |
| 6.0688 | +1 | +1 | +1 | −j |
| 6.0688 | +1 | +1 | +j | +1 |
| 6.0688 | +1 | +1 | −j | +1 |
| 6.0688 | +1 | +j | +j | +j |
| 6.0688 | +1 | −j | +1 | +1 |
| 6.0688 | +1 | −j | −j | −j |
| 6.2188 | +1 | +1 | +j | −1 |
| 6.2188 | +1 | +1 | −1 | −j |
| 6.2188 | +1 | +j | +j | −j |
| 6.2188 | +1 | +j | −1 | +1 |
| 6.2188 | +1 | +j | −1 | −1 |
| 6.2188 | +1 | +j | −j | −j |
| 6.2188 | +1 | −1 | −1 | −j |
| 6.2188 | +1 | −1 | −j | +1 |
| 6.2188 | +1 | +1 | −1 | +j |
| 6.2188 | +1 | −1 | +j | +1 |
| 6.2188 | +1 | −1 | −1 | +j |
| 6.2188 | +1 | −j | −1 | +1 |
| 6.2188 | +1 | −j | −1 | −1 |
| 6.2188 | +1 | −j | −j | +j |
| 6.2188 | +1 | +1 | −j | −1 |
| 6.2188 | +1 | −j | +j | +j |
| 7.7229 | +1 | −1 | +1 | −1 |
| 8.1100 | +1 | +1 | +1 | +1 |
| 8.2600 | +1 | +j | −1 | −j |
| 8.2600 | +1 | −j | −1 | +j |

From the simulation results of Tables 1 to 4, it can be seen that the results are slightly different in the oversampled case and the non-oversampled case, but are generally similar.

In the case in which a signal having a frequency bandwidth of 80 MHz is transmitted, if frequency blocks are sequentially multiplied by the transform sequence of {1, j, a, aj}, respectively, starting from a frequency block having a low frequency band, in the 20 MHz frequency block unit and then transmitted as described above, the PAPR of the transmission signal can be reduced.

As can be seen from the simulation results, since coexistence with a legacy STA processing a signal of 20 MHz or 40 MHz frequency bandwidth is guaranteed by controlling a predetermined complex value a, backward compatibility can be secured. For example, in case where 20 MHz frequency blocks are sequentially multiplied by {+1,+j,−1,−j} in which a predetermined complex value a is −1, starting from a frequency block having a low frequency band, and then transmitted, backward compatibility can be secured. Even though 20 MHz frequency blocks are respectively multiplied by {+j,−1,−j,+1}, {−1,−j,+1,+j} or {−j,+1,+j,−1} which is obtained by cyclically shifting {+1,+j,−1,−j}, the same results can be obtained.

Further, in case where 20 MHz frequency blocks are sequentially multiplied by {+1,+1,−1,+1} or {+1,−1,+1,+1}, starting from a frequency block having a low frequency band, and then transmitted, results optimized from a viewpoint of the PAPR can be obtained. {+1,+1,−1,+1} or {+1,−1,+1,+1} is an optimized sequence in relation to the L-LTF signal. Although the sequence {+1,+1,−1,+1} or {+1,−1,+1,+1} may not be said to be an optimized sequence when viewed in relation to the L-STF signal, the L-STF signal can be made to have a low PAPR from a viewpoint of the entire PAPR when considering the L-STF signal, transmitted together with the L-LTF signal, into consideration. Additionally sequence {+1, −1, −1, 1} from Table 1, 2, 3, 4 also show similar or equal PAPR reduction capability and is an optimized sequence when viewed in relation to the L-STF, L-LTF signal.

In the above method of transmitting a frame for reducing the PAPR, frequency blocks, each constituting a transmission frequency bandwidth, are multiplied by different complex values and then transmitted. A method using a cyclic shift in order to reduce the PAPR is proposed hereinafter. The method of reducing the PAPR using a cyclic shift can be used along with the above method of multiplying frequency blocks by a predetermined complex value.

That is, in accordance with an embodiment of the present invention, a different cyclic shift can be applied to each transmit chain in any one frequency block and, at the same time, a different cyclic shift can be applied to each frequency block in any one transmit chain.

FIG. 6 is a conceptual diagram showing an embodiment of the present invention using Cyclic Shift Delay (CSD) in order to reduce the PAPR. In FIG. 6, a first 20 MHz frequency block is called a first frequency block, and 20 MHz frequency blocks following the first 20 MHz frequency block are sequentially called second, third, and fourth frequency blocks, on the basis of the frequency axis. Likewise, transmit chains are sequentially called first, second, and $n^{th}$ transmit chains from the bottom to the top on the basis of the Tx antenna axis. The same principle applies to FIGS. 7 to 13.

In FIG. 6, $f_k$ indicates a frequency subcarrier index, and $\theta_{nm}$ indicates cyclic delay shift Delay for each transmit chain and each frequency block. Cyclic shifts applied to respective frequency blocks have different values in the same transmit chain, and transmit chains have different cyclic shift values in the frequency block of one frequency band. This takes advantage of the PAPR having an important meaning from a viewpoint of each transmit chain and a different cyclic shift delay being applied to each transmit chain and transmitted in order to obtain a frequency diversity. This is essential similar technique to block-wise sequence multiplication in reducing PAPR for a given repetitive signal. The benefit from this method is that PAPR reduction can be achieved even in 40 MHz, where block-wise sequence multiplication does not give any benefit in term of lowering PAPR.

In the IEEE802.11 standard, Cyclic Shift Delay (CSD) has the same value in all frequency blocks for each transmit chain. In case where data are transmitted through four transmit chains, the transmit chains have different CSD values. Even in the case where 40 MHz transmission is performed, the CSD values are not changed according to frequency blocks. The above method can be called a frequency selective precoding method.

Table 5 shows CSD values regulated in the IEEE 802.11n standard.

TABLE 5

| Number of Transmit Chains | Cyclic shift for transmit chain 1 (ns) | Cyclic shift for transmit chain 2 (ns) | Cyclic shift for transmit chain 3 (ns) | Cyclic shift for transmit chain 4 (ns) |
|---|---|---|---|---|
| 1 | 0 | — | — | — |
| 2 | 0 | −200 | — | — |
| 3 | 0 | −100 | −200 | — |
| 4 | 0 | −50 | −100 | −150 |

Referring to Table 5, in case where data are transmitted using the four transmit chains, the data are transmitted with delay of −50 ns in each of the second transmit chains, the data are transmitted with delay of −100 ns in each of the third transmit chains, and the data are transmitted with delay of −150 in each of the third transmit chains. Cyclic shifts are used to prevent unintentional beamforming when the same signal or scalar multiples of one signal are transmitted through different spatial streams or transmit chains.

FIG. 7 shows an example of the transmission of a frame according to an embodiment of the present invention.

The example of FIG. 7 corresponds to a case in which four transmit chains are used and 40 MHz transmission is performed using two frequency blocks each having a bandwidth of 20 MHz. In the frequency domain, each transmit chain is multiplied by a complex exponential value according to a subcarrier index. Here, a complex phase between two neighboring subcarriers is the same over the entire bandwidth.

An equation for modulated symbols of the frequency domain into an OFDM symbol time signal waveform can be represented by the following Equation 1.

$$s_{x,n}(t) = \frac{1}{\sqrt{N_{norm}}} w_x(t) \sum_{k=-N_{SR}}^{N_{SR}} \gamma_k S_k \exp\left(j2\pi k \Delta_F \left(t - nT_{SYMx} - T_{GIx} - T_{CS,k}^{iTS}\right)\right)$$ [Math. 1]

Where $-N_{SR}$ to $N_{SR}$ is the frequency subcarrier index in which transmit information modulated symbols are defined, $w_x(t)$ is the time domain windowing which is applied to each OFDM symbol, $N_{norm}$ is the normalization factor for a given frequency domain signal, $\Delta_F$ is the subcarrier spacing value, $T_{GIx}$ is the cyclic prefix (or guard time interval) for a specific OFDM symbol, $T_{SYMx}$ is the OFDM symbol length, " " is the OFDM symbol index, $S_k$ is the signal in the frequency domain which is to be transmitted, $\gamma_k$ is the PAPR reduction sequence which is applied to each 20 MHz sub-channel, and $T^{iTS}_{CS,k}$ the cyclic shift delay value which is applied to each transmit antenna chain. In the proposed invention, the cyclic shift delay value is a function of a transmit antenna chain index and a subcarrier index. The cyclic shift delay value may vary for each 20 or 40 MHz sub-channel.

FIGS. 8 and 9 illustrate a method of transmitting a frame according to embodiments of the present invention. In accordance with the embodiment of the present invention, CSD can be applied for every frequency block of 20 MHz and CSD can be applied for every transmit chain. A CSD value can be cyclically shifted and applied to other transmit chains. The added effect of block-wise multiplication of sequence and block-wise CSD application can further reduce PAPR of a given signal. In addition 80 MHz optimized block-wise multiplication sequence in conjucture with block-wise CSD application over 160 MHz can give better PAPR compared to just applying 80 MHz optimized block-wise multiplication of complex value sequence such as {+1, −1, −1, −1}.

For example, as in the example of FIG. 9, CSD values can be (0 ns, −50 ns, −100 ns, −150 ns), and (−50 ns, −100 ns, −150 ns, 0 ns), (−100 ns, −150 ns, 0 ns, −50 ns) and (−150 ns, 0 ns, −50 ns, −100 ns) cyclically shifted from the CSD values (0 ns, −50 ns, −100 ns, −150 ns) can be applied to different transmit chains as CSD values.

TABLE 6

| Number of Transmit Chains | Cyclic shift for transmit chain 1 (ns) | Cyclic shift for transmit chain 2 (ns) | Cyclic shift for transmit chain 3 (ns) | Cyclic shift for transmit chain 4 (ns) | Cyclic shift for transmit chain 5 (ns) | Cyclic shift for transmit chain 6 (ns) | Cyclic shift for transmit chain 7 (ns) | Cyclic shift for transmit chain 8 (ns) |
|---|---|---|---|---|---|---|---|---|
| 1 | 0 | — | — | — | — | — | — | — |
| 2 | 0 | −200 | — | — | — | — | — | — |
| 3 | 0 | −100 | −200 | — | — | — | — | — |
| 4 | 0 | −50 | −100 | −150 | — | — | — | — |
| 5 | 0 | −50 | −100 | −150 | −200 | — | — | — |
| 6 | 0 | −25 | −50 | −75 | −150 | −200 | — | — |
| 7 | 0 | −25 | −50 | −100 | −125 | −150 | −200 | — |
| 8 | 0 | −25 | −50 | −75 | −100 | −125 | −150 | −200 |

TABLE 7

| Number of Transmit Chains | Cyclic shift for transmit chain 1 (ns) | Cyclic shift for transmit chain 2 (ns) | Cyclic shift for transmit chain 3 (ns) | Cyclic shift for transmit chain 4 (ns) | Cyclic shift for transmit chain 5 (ns) | Cyclic shift for transmit chain 6 (ns) | Cyclic shift for transmit chain 7 (ns) | Cyclic shift for transmit chain 8 (ns) |
|---|---|---|---|---|---|---|---|---|
| 1 | 0 | — | — | — | — | — | — | — |
| 2 | 0 | −200 | — | — | — | — | — | — |

TABLE 7-continued

| Number of Transmit Chains | Cyclic shift for transmit chain 1 (ns) | Cyclic shift for transmit chain 2 (ns) | Cyclic shift for transmit chain 3 (ns) | Cyclic shift for transmit chain 4 (ns) | Cyclic shift for transmit chain 5 (ns) | Cyclic shift for transmit chain 6 (ns) | Cyclic shift for transmit chain 7 (ns) | Cyclic shift for transmit chain 8 (ns) |
|---|---|---|---|---|---|---|---|---|
| 3 | 0 | −100 | −200 | — | — | — | — | — |
| 4 | 0 | −50 | −100 | −150 | — | — | — | — |
| 5 | 0 | −50 | −100 | −150 | −200 | — | — | — |
| 6 | 0 | −25 | −50 | −75 | −100 | −125 | — | — |
| 7 | 0 | −25 | −50 | −75 | −100 | −125 | −150 | — |
| 8 | 0 | −25 | −50 | −75 | −100 | −125 | −150 | −175 |

Tables 6 and 7 show examples of CSD values which can be applied to an embodiment of the present invention. The CSD values can be set such that a delay interval between the transmit chains becomes a maximum, the entire cyclic delay is within a range of −200 ns at the same point of time, and a difference in the cyclic delay between neighboring transmit chains is constant.

FIGS. 10 to 13 show examples of the application of CSD according to some embodiments of the present invention. The embodiments of FIGS. 10 to 13 illustrate transmission through four frequency blocks, each having a bandwidth of 20 MHz (i.e., in the case of 80 MHz transmission) and transmission through four transmit chains, three transmit chains, two transmit chains, and one transmit chain, respectively.

In the case of 80 MHz transmission, such as that shown in the example of FIG. 10, CSD can be applied in the unit of 40 MHz corresponding to half the transmission bandwidth (i.e., two frequency blocks each having a bandwidth of 20 MHz) (In the case of 40 MHz transmission, CSD can be applied in the unit of 20 MHz corresponding to half the transmission bandwidth). In case of 160 MHz transmission, CSD can be applied in the unit of 80 MHz corresponding to the half the transmission bandwidth. The example of FIG. 10 shows a case in which a CSD value increased by −25 ns is applied in which CSD is applied. Since a different CSD value for each unit block is applied in the unit of 40 MHz unit and transmitted, there is an advantage in that the PAPR at a receiver terminal can be reduced. Other exemplary CSD value is −800 ns.

In the example of FIGS. 10 to 13, predetermined complex values multiplied to the frequency block having the unit of 20 MHz are {1, +j, +1, +j}, but are only illustrative. For example, in order to reduce the PAPR, a PAPR reduction sequence multiplied to the frequency blocks is not limited to the sequence of {1, +j, +1, +j}, and various sequences such as {+1, −1, −1, 1} of Tables 1 to 4 can be used as occasion demands.

Tables 8 and 9 below show examples of CSD values applicable to an embodiment of the present invention.

TABLE 8

| Number of Transmit Chains | Cyclic shift for transmit chain 1 (ns) | Cyclic shift for transmit chain 2 (ns) | Cyclic shift for transmit chain 3 (ns) | Cyclic shift for transmit chain 4 (ns) | Cyclic shift for transmit chain 5 (ns) | Cyclic shift for transmit chain 6 (ns) | Cyclic shift for transmit chain 7 (ns) | Cyclic shift for transmit chain 8 (ns) |
|---|---|---|---|---|---|---|---|---|
| 1 | 0 | — | — | — | — | — | — | — |
| 2 | 0 | −175 | — | — | — | — | — | — |
| 3 | 0 | −75 | −150 | — | — | — | — | — |
| 4 | 0 | −50 | −100 | −150 | — | — | — | — |
| 5 | 0 | −25 | −75 | −125 | −175 | — | — | — |
| 6 | 0 | −25 | −50 | −75 | −100 | −125 | — | — |
| 7 | 0 | −25 | −50 | −75 | −100 | −125 | −150 | — |
| 8 | 0 | −25 | −50 | −75 | −100 | −125 | −150 | −175 |

TABLE 9

| Number of Transmit Chains | Cyclic shift for transmit chain 1 (ns) | Cyclic shift for transmit chain 2 (ns) | Cyclic shift for transmit chain 3 (ns) | Cyclic shift for transmit chain 4 (ns) | Cyclic shift for transmit chain 5 (ns) | Cyclic shift for transmit chain 6 (ns) | Cyclic shift for transmit chain 7 (ns) | Cyclic shift for transmit chain 8 (ns) |
|---|---|---|---|---|---|---|---|---|
| 1 | 0 | — | — | — | — | — | — | — |
| 2 | 0 | −175 | — | — | — | — | — | — |
| 3 | 0 | −100 | −175 | — | — | — | — | — |
| 4 | 0 | −75 | −150 | −175 | — | — | — | — |
| 5 | 0 | −50 | −100 | −150 | −175 | — | — | — |
| 6 | 0 | −25 | −50 | −100 | −150 | −175 | — | — |
| 7 | 0 | −25 | −50 | −100 | −125 | −150 | −175 | — |
| 8 | 0 | −25 | −50 | −75 | −100 | −125 | −150 | −175 |

As the method of reducing the PAPR at the receiver terminal, the method of multiplying each of frequency blocks, constituting a transmission frequency band, by a predetermined complex value and transmitting the frequency blocks and the method of applying CSD to each frequency block and each transmit chain and transmitting the frequency blocks have been described above. However, the above-described two methods can be applied individually or together. The PAPR reduction sequences or the CSD value are only for convenience of description, and the technical spirit of the present invention is not limited thereto.

FIG. 14 is a block diagram showing a wireless apparatus in which the embodiments of the present invention can be implemented. The wireless apparatus 1400 can be an AP or Non-AP STA.

The wireless apparatus 1400 includes a processor 1410, memory 1420, a transceiver 1430, and an antenna 1450. The transceiver 1430 transmits and receives a frame. The processor 1410 is connected to the transceiver 1430 and configured to generate the frame. The processor 1410 and the transceiver 1430 implement the physical layer and the MAC layer of the IEEE 802.11 standard. The processor 1410 or the transceiver 1430 or both can include an Application-Specific Integrated Circuit (ASIC), other chipset circuit, and/or a data processing apparatus. The memory 1420 can include Read-Only Memory (ROM), Random Access Memory (RAM), flash memory, a memory card, a storage medium and/or other storage device. When the above embodiments are implemented in software, the above schemes can be implemented using a module (or process, function, etc.) which performs the above functions. The module can be stored in the memory 1420 and executed by the processor 1410. The memory 1420 can be placed inside or outside the processor 1410 and connected to the processor 1410 using a variety of well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for transmitting data in a wireless local area network, the method comprising:

generating a first block sequence corresponding to four long training field (LTF) frequency blocks {ALTF1, BLTF1, CLTF1, DLTF1}, the first block sequence being included in a first LTF in an ascending order of a subcarrier index, a phase of the first LTF being rotated in a frequency domain by multiplying the first block sequence {ALTF1, BLTF1, CLTF1, DLTF1} by a sequence {+1, −1, −1, −1};

generating a second block sequence corresponding to four LTF frequency blocks {ALTF2, BLTF2, CLTF2, DLTF2}, the second block sequence being included in a second LTF in an ascending order of a subcarrier index, a phase of the second LTF being rotated in the frequency domain by multiplying the second block sequence {ALTF2, BLTF2, CLTF2, DLTF2} by a sequence {+1, +1, +1, +1};

generating a first time domain signal for a first orthogonal frequency division multiplexing (OFDM) symbol by transforming $S_1\exp(j2\pi k\Delta_{F1}(t-T_{GI1}-T_{cs1}))$, where $S_1$ is the first block sequence, k is a subcarrier index, $\Delta_{F1}$ is a subcarrier spacing value for the first OFDM symbol, $T_{GI1}$ is a guard time interval for the first OFDM symbol, and $T_{cs1}$ is a first cyclic shift delay applied to the first block sequence;

generating a second time domain signal for a second OFDM symbol by transforming $S_2\exp(j2\pi k\Delta_{F2}(t-T_{GI2}-T_{cs2}))$, where $S_2$ is the second block sequence, k is a subcarrier index, $\Delta_{F2}$ is a subcarrier spacing value for the second OFDM symbol, $T_{GI2}$ is a guard time interval for the second OFDM symbol, and $T_{cs2}$ is a second cyclic shift delay applied to the second block sequence, wherein the second cyclic shift delay is larger than the first cyclic shift delay; and transmitting sequentially the first and second time domain signals over 80 MHz bandwidth.

2. The method of claim 1, wherein the first LTF is a legacy-LTF (L-LTF).

3. A device for a wireless local area network, the device comprising:

a transceiver configured to transmit and receive radio signals; and a processor coupled with the transceiver and configured to:

generate a first block sequence corresponding to four long training field (LTF) frequency blocks {ALTF1, BLTF1, CLTF1, DLTF1}, the first block sequence being included in a first LTF in an ascending order of a subcarrier index, a phase of the first LTF being rotated in a frequency domain by multiplying the first block sequence {ALTF1, BLTF1, CLTF1, DLTF1} by a sequence {+1, −1, −1, −1}, generate a second block sequence corresponding to four LTF frequency blocks {ALTF2, BLTF2, CLTF2, DLTF2}, the second block sequence being included in a second LTF in an ascending order of a subcarrier index, a phase of the second LTF being rotated in the frequency domain by multiplying the second block sequence {ALTF2, BLTF2, CLTF2, DLTF2} by a sequence {+1, +1, +1, +1}, generate a first time domain signal for a first orthogonal frequency division multiplexing (OFDM) symbol by transforming $S_1\exp(j2\pi k\Delta_{F1}(t-T_{GI1}-T_{cs1}))$, where $S_1$ is the first block sequence, k is a subcarrier index, $\Delta_{F1}$ is a subcarrier spacing value for the first OFDM symbol, $T_{GI1}$ is a guard time interval for the first OFDM symbol, and $T_{cs1}$ is a first cyclic shift delay applied to the first block sequence, generate a second time domain signal for a second OFDM symbol by transforming $S_2\exp(j2\pi k\Delta_{F2}(t-T_{GI2}-T_{cs2}))$, where $S_2$ is the second block sequence, k is a subcarrier index, $\Delta_{F2}$ is a subcarrier spacing value for the second OFDM symbol, $T_{GI2}$ is a guard time interval for the second OFDM symbol, and $T_{cs2}$ is a second cyclic shift delay applied to the second block sequence, wherein the second cyclic shift delay is larger than the first cyclic shift delay, and transmit sequentially the first and second time domain signals over 80 MHz bandwidth.

* * * * *